United States Patent
Watts et al.

(10) Patent No.: US 12,125,599 B2
(45) Date of Patent: Oct. 22, 2024

(54) METHOD AND SYSTEM FOR MEASURING MOISTURE CARRYOVER IN A NUCLEAR REACTOR

(71) Applicant: GE-Hitachi Nuclear Energy Americas LLC, Wilmington, NC (US)

(72) Inventors: Kevin D. Watts, Wilmington, NC (US); Hubert H. Huie, Wilmington, NC (US); Aimee Lee Lavigne, Wilmington, NC (US); Vincent Carl Vigliano, Wilmington, NC (US); Mary Bodar Callahan, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 85 days.

(21) Appl. No.: 17/679,784

(22) Filed: Feb. 24, 2022

(65) Prior Publication Data

US 2023/0268090 A1    Aug. 24, 2023

(51) Int. Cl.
*G21C 17/028* (2006.01)
*G01T 1/16* (2006.01)
*G21C 17/06* (2006.01)

(52) U.S. Cl.
CPC ............ *G21C 17/06* (2013.01); *G01T 1/16* (2013.01); *G21C 17/028* (2013.01)

(58) Field of Classification Search
CPC .......... G21C 17/06; G21C 17/028; G21T 1/16
See application file for complete search history.

(56) References Cited

U.S. PATENT DOCUMENTS

| | | | | |
|---|---|---|---|---|
| 4,649,015 A | * | 3/1987 | DeVolpi ............... | G21C 17/035 376/245 |
| 5,345,478 A | * | 9/1994 | Maire ................. | G01B 15/025 376/245 |
| 5,425,064 A | * | 6/1995 | Termaat ............... | G21C 17/10 376/245 |
| 5,552,608 A | * | 9/1996 | Gallagher ............ | H01J 37/244 250/397 |

(Continued)

FOREIGN PATENT DOCUMENTS

| | | | |
|---|---|---|---|
| JP | 04278496 A | * | 10/1992 |
| JP | 2007064635 A | * | 3/2007 |
| JP | 4340574 B2 | * | 10/2009 |

(Continued)

*Primary Examiner* — Lily C Garner
(74) *Attorney, Agent, or Firm* — Harness, Dickey & Pierce, P.L.C.

(57) ABSTRACT

A method of measuring moisture carryover (MCO) in a nuclear reactor includes placing a first gamma detector adjacent to a steam conduit configured to transport steam generated by the core. The method additionally includes detecting a first amount of carryover gamma activity of a first quantity of sodium-24 in the steam within the steam conduit with the first gamma detector. The method also includes detecting a second amount of reference gamma activity of a second quantity of sodium-24 in a reference sample of reactor water from the core with a second gamma detector. The method further includes determining a flow rate of liquid water entrained in the steam based on the first amount of carryover gamma activity detected by the first gamma detector and the second amount of reference gamma activity detected by the second gamma detector.

20 Claims, 8 Drawing Sheets

(56) References Cited

U.S. PATENT DOCUMENTS

| | | | | |
|---|---|---|---|---|
| 8,946,645 B2* | 2/2015 | De Volpi | ............ | G01F 23/2885 250/370.09 |
| 2012/0197529 A1* | 8/2012 | Stephenson | ............ | G01V 5/101 250/269.6 |

FOREIGN PATENT DOCUMENTS

| JP | 5506549 B2 | * | 5/2014 |
|---|---|---|---|
| JP | 2015175609 A | * | 10/2015 |

* cited by examiner

600

514

METHOD AND SYSTEM FOR MEASURING MOISTURE CARRYOVER IN A NUCLEAR REACTOR

BACKGROUND

Field

The present disclosure relates to the measurement of liquid water entrained in the steam (moisture carryover) that is used to drive the turbines of a nuclear reactor.

Description of Related Art

A nuclear reactor is used to initiate and control a nuclear chain reaction and may be employed at a nuclear power plant to generate electricity. One example of such a reactor is a boiling water reactor (BWR). In a boiling water reactor, heat is produced by nuclear fission in the core, and liquid water is used as a coolant. The heat from the core causes the liquid water to boil and convert to steam which is then directly used to drive a turbine. Afterwards, the steam is cooled in a condenser and converted back to liquid water which is then returned to the core as part of a continuous loop during the operation of the reactor.

During typical reactor conditions, the steam used to drive the turbine is not a pure vapor phase steam. Instead, liquid water in the form of droplets may be entrained with the generated steam. Elevated levels of liquid water in the steam may cause a variety of issues ranging from erosion/corrosion of turbine components to inaccurate analyses and lost revenues due to reduced thermodynamic efficiency and ultimately component failure/replacement.

SUMMARY

At least one embodiment relates to a method of measuring moisture carryover (MCO) in a nuclear reactor. In an example embodiment, the method may include placing a first gamma detector adjacent to a steam conduit configured to transport steam generated by a core of the nuclear reactor; detecting a first amount of carryover gamma activity of a first quantity of sodium-24 in the steam within the steam conduit with the first gamma detector; detecting a second amount of reference gamma activity of a second quantity of sodium-24 in a reference sample of reactor water from the core with a second gamma detector; and determining a flow rate of liquid water entrained in the steam based on the first amount of carryover gamma activity detected by the first gamma detector and the second amount of reference gamma activity detected by the second gamma detector.

In an additional embodiment of the method, the placing may include the steam conduit being configured to transport the steam exiting from steam dryers of the nuclear reactor.

In another embodiment of the method, the placing may include the steam conduit being a direct inlet line to turbines of the nuclear reactor.

In another embodiment of the method, the placing may include providing the first gamma detector with a radiation shield including lead and tungsten sections to protect against radiation damage.

In another embodiment of the method, the placing may include the nuclear reactor being a boiling water reactor (BWR).

In another embodiment of the method, the detecting may include maintaining the first gamma detector at an operating temperature within a range of 95-105 K.

In another embodiment of the method, the detecting may include the first quantity of sodium-24 and the second quantity of sodium-24, respectively, being created within a core of the nuclear reactor.

In another embodiment of the method, the detecting may include the first quantity of sodium-24 and the second quantity of sodium-24, respectively, being created from sodium-23 within the reactor water.

In another embodiment of the method, the detecting with the first gamma detector and the second gamma detector, respectively, may include counting 1368 keV gamma rays from a decay of the first quantity of sodium-24 and the second quantity of sodium-24, respectively.

In a further embodiment of the method, the detecting with the first gamma detector and the second gamma detector, respectively, may include a use of a cobalt-60 source for calibration.

At least one embodiment relates to a moisture carryover measurement system for a nuclear reactor. In an example embodiment, the system may include a first gamma detector adjacent to a steam conduit configured to transport steam generated by a core of the nuclear reactor, the first gamma detector configured to detect a first amount of carryover gamma activity of a first quantity of sodium-24 in the steam within the steam conduit; a second gamma detector configured to determine a second amount of reference gamma activity of a second quantity of sodium-24 in a reference sample of reactor water from the core; and processing circuitry configured to calculate a flow rate of liquid water entrained in the steam based on the first amount of carryover gamma activity detected by the first gamma detector and the second amount of reference gamma activity detected by the second gamma detector.

In an additional embodiment of the system, the steam conduit may be configured to transport the steam exiting from steam dryers of the nuclear reactor.

In another embodiment of the system, the steam conduit may be a direct inlet line to turbines of the nuclear reactor.

In another embodiment of the system, the first gamma detector may include a radiation shield having lead and tungsten sections to protect against radiation damage.

In another embodiment of the system, the nuclear reactor may be a boiling water reactor (BWR).

In another embodiment, the system may further include a cooling apparatus configured to maintain the first gamma detector at an operating temperature within a range of 95-105 K.

In another embodiment of the system, the first quantity of sodium-24 and the second quantity of sodium-24 may be reactor-generated isotopes created within a core of the nuclear reactor.

In another embodiment of the system, the first quantity of sodium-24 and the second quantity of sodium-24 may be reactor-generated isotopes created from sodium-23 within the reactor water.

In another embodiment of the system, the first gamma detector and the second gamma detector may be configured to count 1368 keV gamma rays from a decay of the first quantity of sodium-24 and the second quantity of sodium-24, respectively.

In a further embodiment of the system, the first gamma detector and the second gamma detector may be calibrated with a cobalt-60 source.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
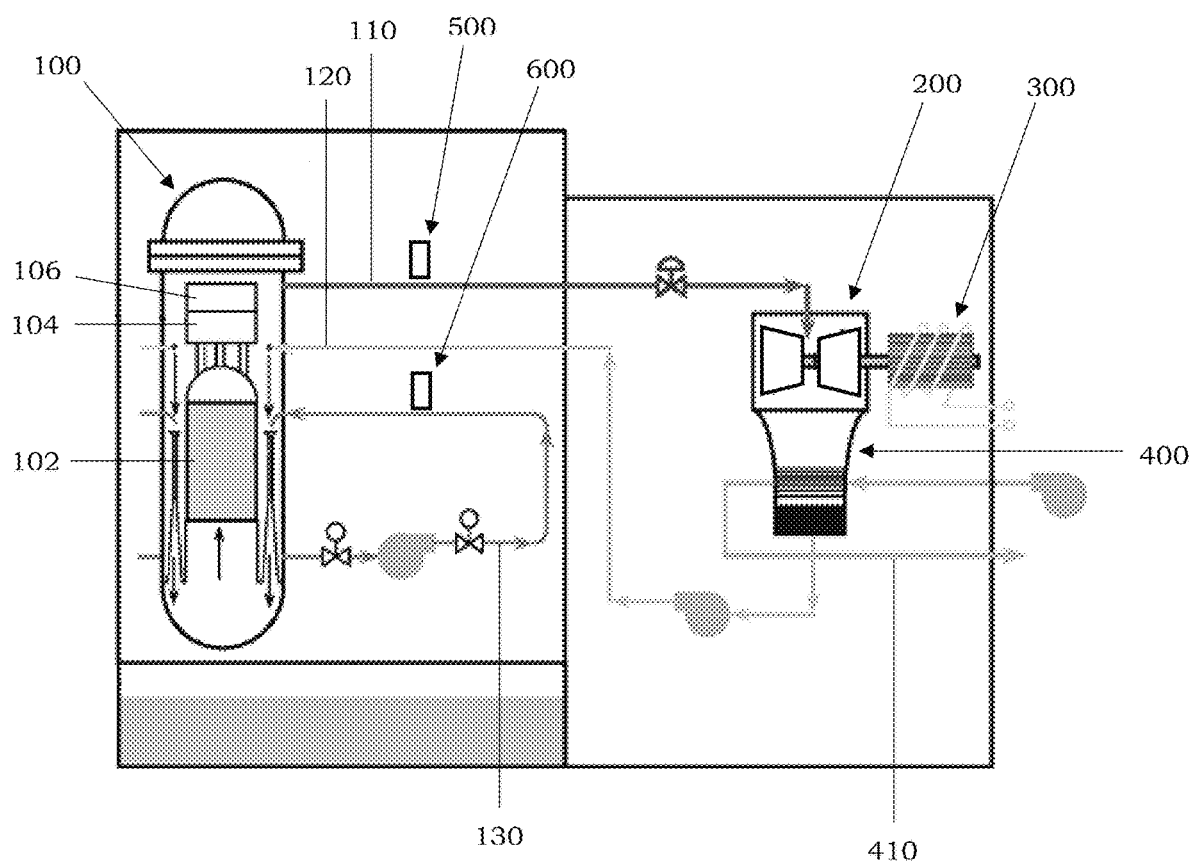
FIG. 1 is a schematic view of a nuclear reactor including a moisture carryover measurement system according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The processing circuitry may be hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

FIG. 1 is a schematic view of a nuclear reactor including a moisture carryover measurement system according to an example embodiment. Referring to FIG. 1, the nuclear reactor 1000 may be a boiling water reactor (BWR) that includes a reactor pressure vessel (RPV) 100 wherein, during operation, the heat from the core 102 causes the liquid water to boil and convert to steam. The generated steam travels through a steam separator 104 for an initial removal of entrained liquid water droplets (e.g., first stage of moisture separation) followed by a steam dryer 106 for further removal of entrained liquid water droplets (e.g., second stage of moisture separation). The steam exiting the steam dryer 106 is then directed through a steam conduit 110 to a turbine 200 which turns the generator 300 to produce electricity. After the turbine 200, the steam is cooled by a condenser 400 and converted back to liquid water. The coolant conduit 410 may supply a coolant that is pumped from (and returned to) a local body of water (e.g., river) to provide the requisite heat exchange in the condenser 400 to cool the steam. The liquid water exiting the condenser 400 is then pumped back to the core 102 of the reactor pressure vessel 100 via a feedwater conduit 120 to repeat the cycle of steam generation/actuation/condensation. The liquid water within the reactor pressure vessel 100 may also be recirculated through a recirculation conduit 130 (e.g., via a recirculation pump external to the reactor pressure vessel 100 and a jet pump within the reactor pressure vessel 100) to control the reactor power level or to cool the reactor during an off-normal state. Furthermore, a first detection assembly 500 and a second detection assembly 600 are provided to measure the moisture carryover (MCO) in the nuclear reactor 1000.

In an example embodiment, the first detection assembly 500 and the second detection assembly 600 are part of a moisture carryover measurement system (e.g., on-line MCO measurement system) configured to detect the activity level of a target radioisotope. The target radioisotope has a relatively short half-life (e.g., less than 24 hours). Additionally, the target radioisotope is one that is created from a stable isotope that is already present in the liquid water supplied to the reactor pressure vessel 100 and is generated when the reactor water is heated/boiled by the core 102. For instance, the target radioisotope may be sodium-24 ($^{24}$Na).

Although the first detection assembly 500 and the second detection assembly 600 are illustrated as being implemented in connection with the steam conduit 110 and the recirculation conduit 130, respectively, it should be understood that example embodiments are not limited thereto. The accompanying drawings are merely intended to help convey the overarching concepts of the present methods and systems for measuring moisture carryover and, thus, are not meant to be limiting. As a result, it should be understood that the first detection assembly 500 and the second detection assembly 600 may be implemented in connection with other suitable conduits/lines consistent with the teachings herein, particularly conduits/lines that may not have been specifically illustrated in the schematic views of the drawings. The first detection assembly 500 and the second detection assembly 600 of the moisture carryover measurement system are discussed in more detail below.

Figure 2:
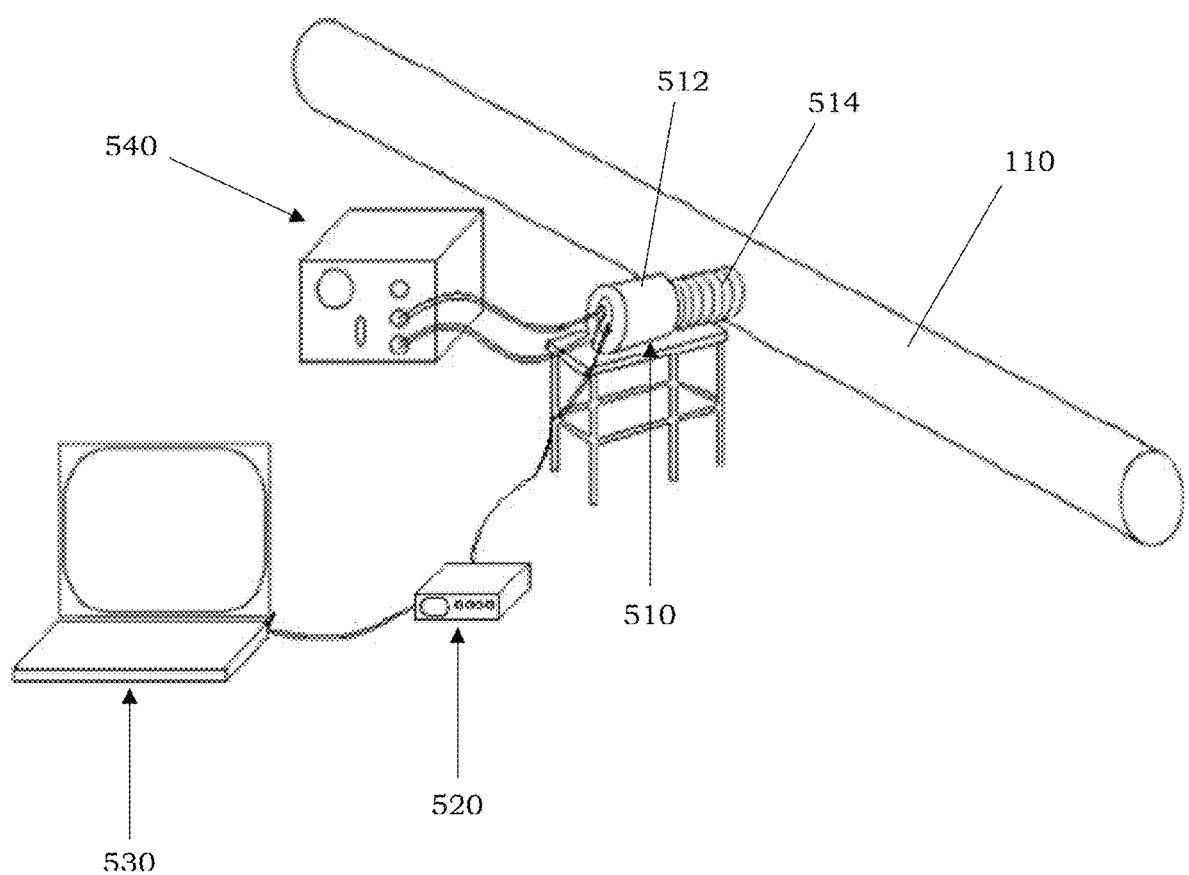
FIG. 2 is a schematic view of a first detection assembly of the moisture carryover measurement system in FIG. 1.

FIG. 2 is a schematic view of a first detection assembly of the moisture carryover measurement system in FIG. 1. Referring to FIG. 2, the first detection assembly 500 includes a first detector 510 positioned adjacent to the steam conduit 110. In some instances, the first detector 510 may be mounted to a support stand to achieve the proper height and angle so as to contact the facing surface perpendicular to the detector crystal face. The steam conduit 110 is configured to transport steam generated by the core 102 of the nuclear reactor 1000. In an example embodiment, the steam conduit 110 is configured to transport the steam exiting from the steam dryer 106 of the nuclear reactor 1000. Additionally, the steam conduit 110 may be a direct inlet line to the turbine 200 of the nuclear reactor 1000. However, it should be understood that other conduits may also be suitable locations for the first detector 510. Notably, the installation of the first detection assembly 500 can be in any location which allows access for direct measurement of a condensate line or location where an accumulation of moisture within the steam line will condense at a known location that is accessible where the first detector 510 can be mounted for counting purposes. For instance, the first detector 510 may instead be positioned adjacent to a condensate line (e.g., from the steam separator 104 or the steam dryer 106).

The first detector 510 is connected to processing circuitry configured to analyze the readings from the first detector 510. The processing circuitry may include a multi-channel analyzer (MCA) 520 and a computer 530 (e.g., laptop). The computer 530 includes a processor and a memory. The memory is configured to store executable data that, when executed by the processor, cause the computer 530 to perform the methods disclosed herein. The multi-channel analyzer 520 is configured to analyze input signals made up of pulses (e.g., digitizing spectroscopy). In particular, the multi-channel analyzer 520 uses an analog-to-digital converter (ADC) to record incoming pulses and stores the information about the pulses in pulse-height analysis (PHA) mode or multi-channel scaling (MCS) mode.

The first detector 510 may include a detector cooling housing 512 and a detector shielding 514. A cooling apparatus 540 is connected to the detector cooling housing 512 of the first detector 510. The cooling apparatus 540 may be a cryocooler configured to reach cryogenic temperatures (e.g., below 120 K or −153° C.). In an example embodiment, the cooling apparatus 540 is configured to maintain the first detector 510 at an operating temperature within a range of 95 to 105 K (−178 to −168° C.). The detector shielding 514 is configured as a radiation shield designed to protect the first detector 510 (e.g., detector crystal and pre-amplifier electronics) against radiation damage. The detector shielding 514 may have lead and tungsten sections.

In an example embodiment, the first detector 510 is in a form of a first gamma detector. In such an instance, the first detector 510 may be configured to detect a first amount of carryover gamma activity of a first quantity of sodium-24 in the steam within the steam conduit 110. With regard to material of construction, the first detector 510 may be a semiconductor-based detector (e.g., germanium detector).

Figure 3:
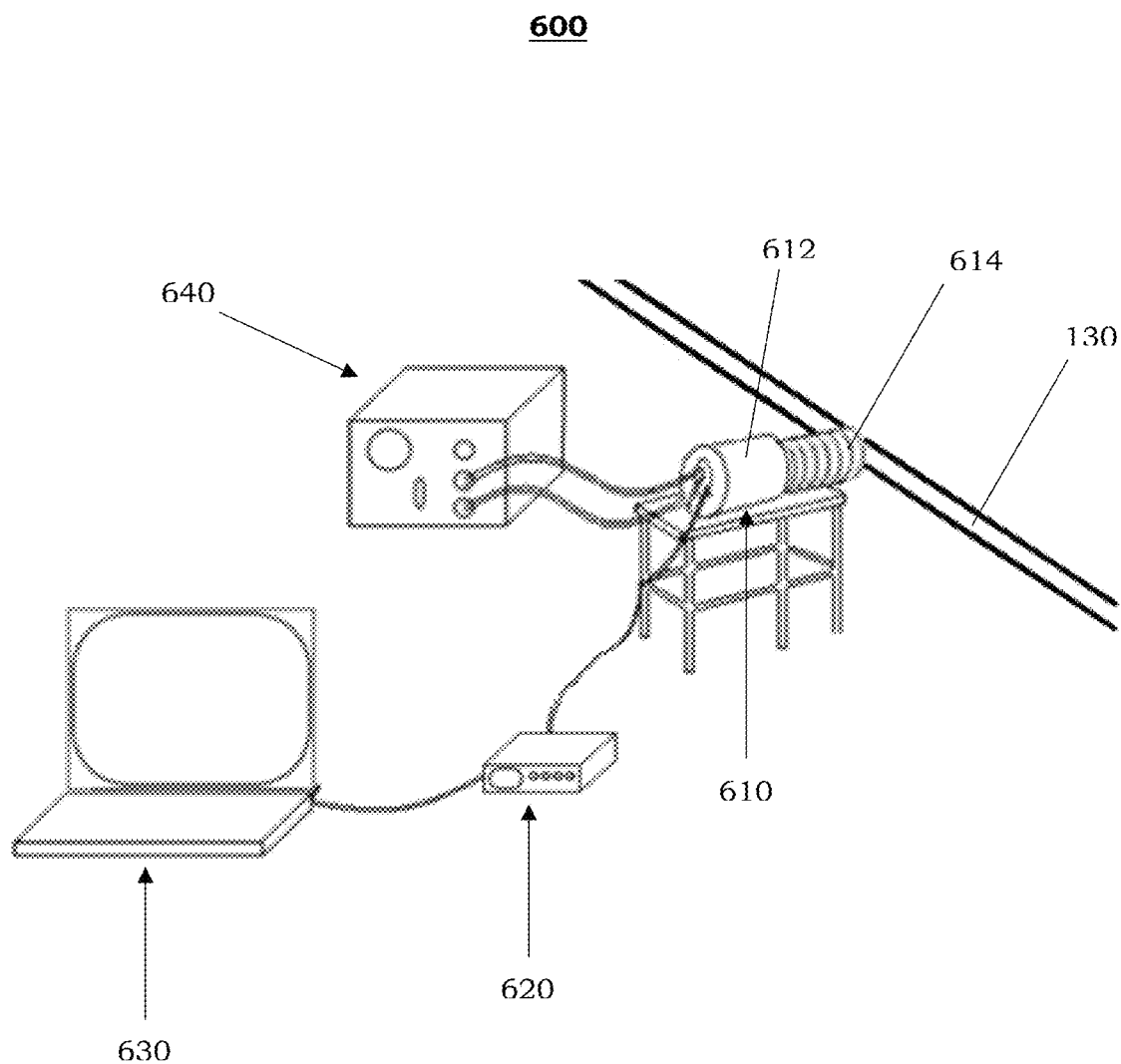
FIG. 3 is a schematic view of a second detection assembly of the moisture carryover measurement system in FIG. 1.

FIG. 3 is a schematic view of a second detection assembly of the moisture carryover measurement system in FIG. 1. Referring to FIG. 3, the second detection assembly 600 includes a second detector 610 positioned adjacent to the recirculation conduit 130. However, it should be understood that other conduits may also be suitable locations for the second detector 610. For instance, the second detector 610 may instead be positioned adjacent to another conduit that can serve as an appropriate test line for the reactor water.

In an example embodiment, the second detector 610, the multi-channel analyzer 620, the computer 630, and the cooling apparatus 640 in FIG. 3 may be the same as the first detector 510, the multi-channel analyzer 520, the computer 530, and the cooling apparatus 540 in FIG. 2. Similarly, the detector cooling housing 612 and the detector shielding 614 in FIG. 3 may be the same as the detector cooling housing 512 and the detector shielding 514 in FIG. 2. Accordingly, it should be understood that the above descriptions in connection with the first detector 510, the detector cooling housing 512, the detector shielding 514, the multi-channel analyzer 520, the computer 530, and the cooling apparatus 540 in FIG. 2 are also applicable to the second detector 610, the detector cooling housing 612, the detector shielding 614, the multi-channel analyzer 620, the computer 630, and the cooling apparatus 640 in FIG. 3. Thus, the applicable descriptions above in connection with FIG. 2 have not been repeated in connection with FIG. 3 in the interest of brevity.

Referring to FIG. 3, the second detector 610 may be in the form of a second gamma detector. In such an instance, the second detector 610 may be configured to determine a second amount of reference gamma activity of a second quantity of sodium-24 in a reference sample of reactor water from the core 102. With regard to material of construction, the second detector 610 may be a semiconductor-based detector (e.g., germanium detector).

The processing circuitry of the first detection assembly 500 and the second detection assembly 600 are configured to calculate a flow rate of liquid water entrained in the steam based on the first amount of carryover gamma activity detected by the first detector 510 and the second amount of reference gamma activity detected by the second detector 610. In an example embodiment, the first quantity of sodium-24 and the second quantity of sodium-24 are reactor-generated isotopes created within the core 102 of the nuclear reactor 1000. For instance, the first quantity of sodium-24 and the second quantity of sodium-24 may be reactor-generated isotopes created from the sodium-23 within the reactor water. The first detector 510 and the second detector 610 are configured to count the 1368 keV gamma rays from a decay of the first quantity of sodium-24 and the second quantity of sodium-24, respectively. Furthermore, as will be subsequently discussed in more detail, the first detector 510 and the second detector 610 may be calibrated with a cobalt-60 ($^{60}$Co) source.

Figure 4:
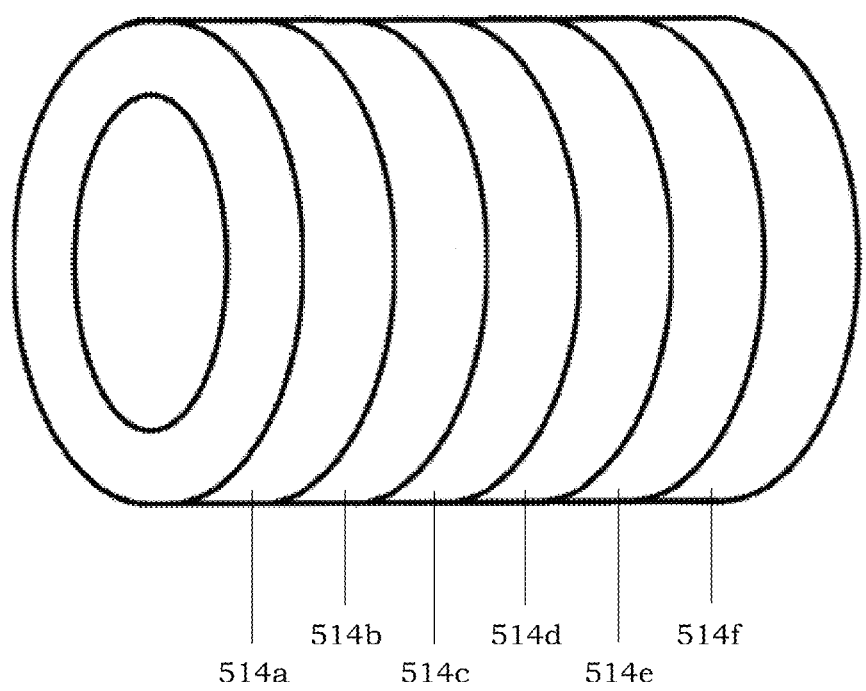
FIG. 4 is an isolated view of the detector shielding of the first detector in FIG. 2.

FIG. 4 is an isolated view of the detector shielding of the first detector in FIG. 2. Referring to FIG. 4, the detector shielding 514 includes a plurality of shielding sections 514a, 514b, 514c, 514d, 514e, and 514f. The detector shielding 514 may have a modular design such one or more sections may be added or removed to obtain the desired shielding length. In an example embodiment, each of the plurality of shielding sections 514a, 514b, 514c, 514d, 514e, and 514f has an annular form. As a result, the detector shielding 514 may have a cylindrical structure when assembled. With regard to materials of construction, the detector shielding 514 may be formed of two different materials. For instance, the shielding sections 514a and 514f on the ends may be formed of tungsten (W), while the shielding sections 514b, 514c, 514d, and 514e in between may be formed of lead (Pb). As noted supra, the relevant descriptions in connection with the detector shielding 514 are also applicable to the detector shielding 614.

Figure 5:
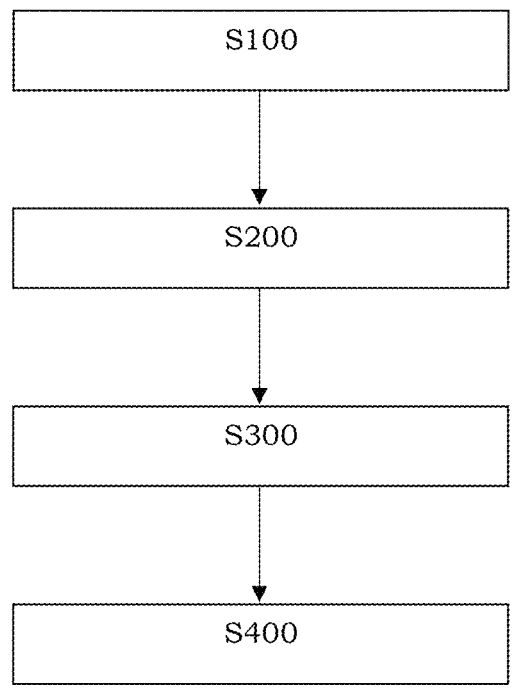
FIG. 5 is a flow diagram of a method of measuring moisture carryover in a nuclear reactor according to an example embodiment.

FIG. 5 is a flow diagram of a method of measuring moisture carryover in a nuclear reactor according to an example embodiment. Referring to FIG. 5, the method may include a detecting/determining step S100 for the carryover gamma activity, a detecting/determining step S200 for the reference gamma activity, a calculating/determining step S300 for the amount/flow rate of liquid water entrained in the steam based on the carryover gamma activity and the reference gamma activity, and a controlling step S400 for controlling operation of the nuclear reactor based on the determined amount/flow rate of liquid water entrained in the steam. More specifically, in S100, the carryover gamma activity in S100 will be an indication that liquid water is present as moisture carryover, because pure steam is just H$_2$O without any radioisotopes (which will theoretically not have any carryover gamma activity) while liquid water will contain radioisotopes generated by the core (and, thus, have some amount of carryover gamma activity). The reference gamma activity in S200 will provide a known level of activity for a given amount/flow of reactor water. As a result, the detected level of carryover gamma activity and the detected level of reference gamma activity for a given amount/flow of reactor water will allow for the calculation of the amount/flow of liquid water being entrained by the steam (moisture carryover).

For instance, a method of measuring moisture carryover in a nuclear reactor 1000 may include a step S100 of detecting a first amount of carryover gamma activity of a first quantity of sodium-24 in the steam within the steam conduit 110 with the first detector 510. Additionally, the method may include a step S200 of detecting a second amount of reference gamma activity of a second quantity of sodium-24 in a reference sample of reactor water from the core 102 with a second detector 610. The amount/flow of the reference sample of reactor water may be a known or readily obtained value. The method may also include a step S300 of determining a flow rate of liquid water entrained in the steam based on the first amount of carryover gamma activity detected by the first gamma detector and the second amount of reference gamma activity detected by the second gamma detector. It should be understood that the determining step S300 may be achieved with calculations and/or lookup tables (LUT) stored in memory. Furthermore, the method may include a step S400 of controlling the nuclear reactor based on the determined flow rate of liquid water entrained in the steam (moisture carryover). Step S400 may include taking measures to reduce the moisture carryover so as to protect downstream components (e.g., turbine blades). For instance, step S400 may include adjustments to the recirculation pump(s) and/or the control rods. With the present method and corresponding system, the moisture carryover can be continuously monitored on-line and in real-time so as to be available any given time of day or night.

The sodium-24 may be formed in the core 102 by both fast and thermal neutron activation of the sodium-23 already present in the reactor water. After formation, the sodium-24 undergoes β-decay with a 14.959-hour half-life. The gamma spectrometry requirements for the MCO measurement process relies on the capability to detect and accurately measure the gamma rays emitted from the decay of sodium-24 present in the reactor water (e.g., droplets) entrained in the steam conduit 110 (e.g., high purity steam line) leading to the high-pressure side of the turbine 200.

Figure 6:
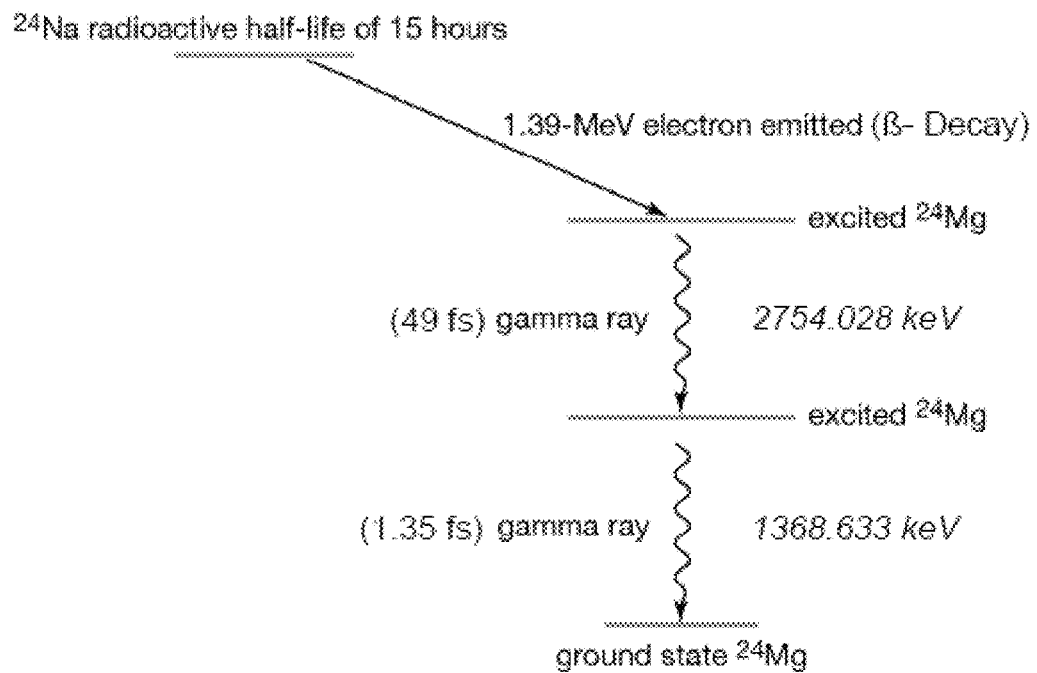
FIG. 6 is a decay scheme of sodium-24, the gamma activity of which is detected in connection with the method of FIG. 5.

FIG. 6 is a decay scheme of sodium-24, the gamma activity of which is detected in connection with the method of FIG. 5. Referring to FIG. 6, sodium-24 decays to magnesium-24 by emitting an electron and two gamma rays. In particular, the sodium-24 initially undergoes β-decay to an excited $^{24}$Mg* nucleus and then emits two gamma rays, a first gamma ray after 49 fs and a second gamma ray 1.35 fs later to achieve the stable ground state $^{24}$Mg nuclei. These two primary gamma rays have energies of 2754.028 keV and 1368.633 keV, respectively. The measurement of the quantity of sodium-24, when compared to the baseline relative known activity rate in a volume of reactor water, can be employed to determine the actual quantity of moisture carryover (e.g., liquid droplets) present in the inlet line to the turbine 200.

Figure 7:
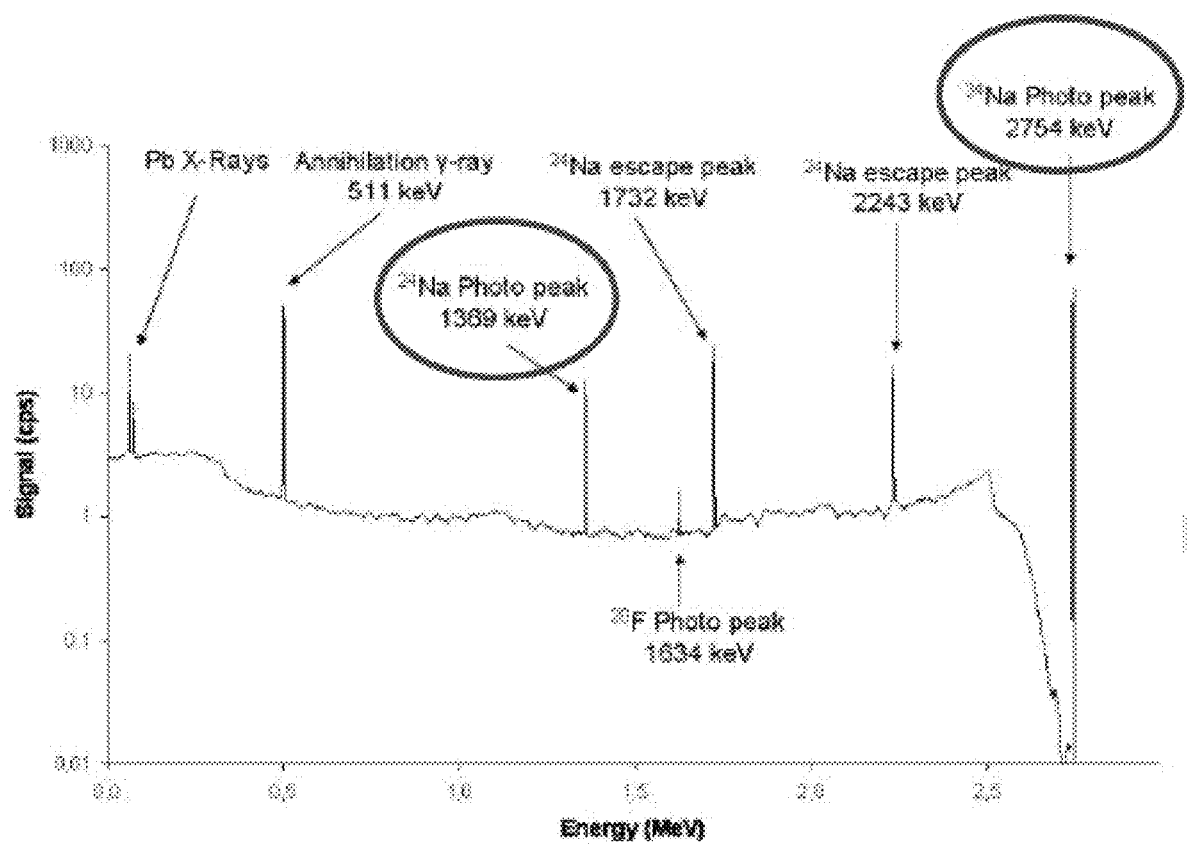
FIG. 7 is a measurement spectrum of various spectral peaks of interest, including those for sodium-24, in connection with the method of FIG. 5.

FIG. 7 is a measurement spectrum of various spectral peaks of interest, including those for sodium-24, in connection with the method of FIG. 5. Referring to FIG. 7, the locations of the $^{24}$Na energy peaks are shown and circled increased visibility. The main gamma energy peak at 1368.633 keV can be located relatively easily by using a cobalt-60 source for detector system calibration.

Figure 8:
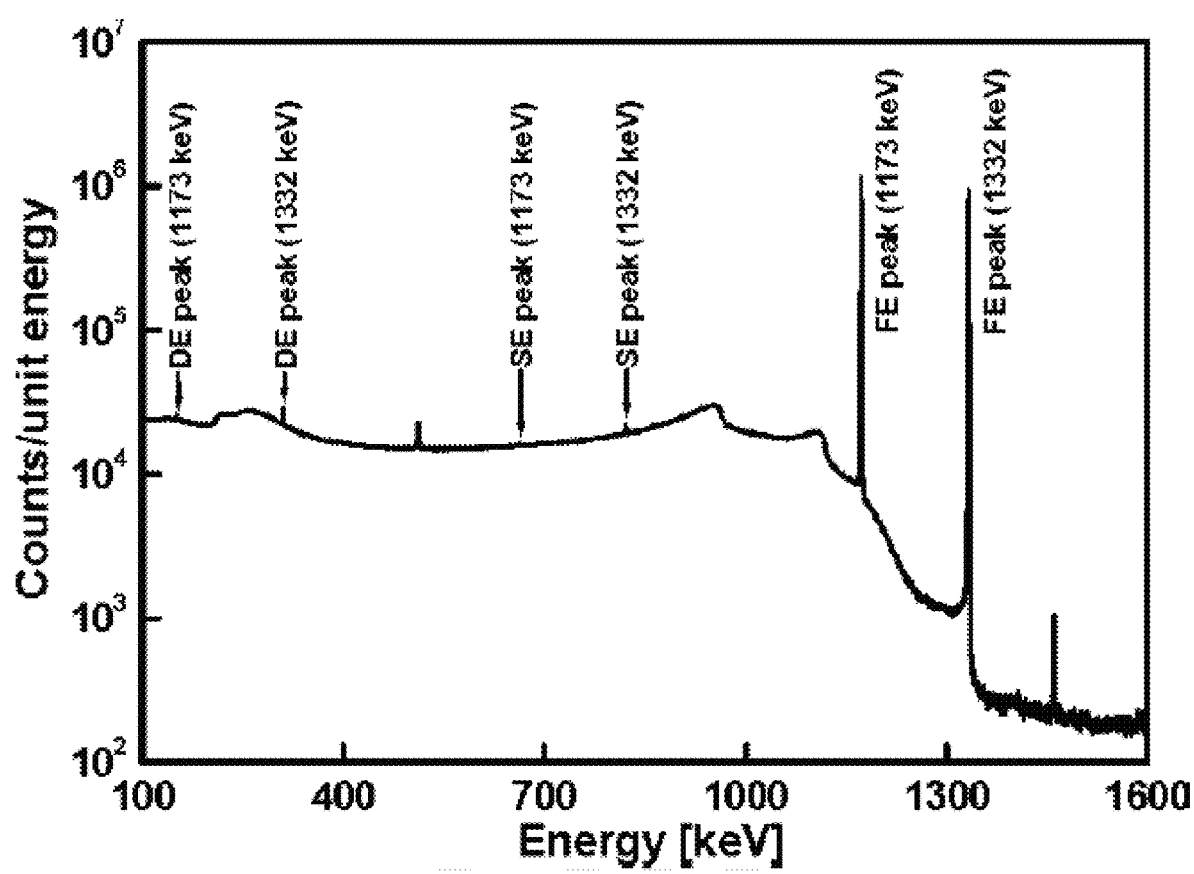
FIG. 8 is a calibration spectrum of cobalt-60 in connection with the method of FIG. 5.

FIG. 8 is a calibration spectrum of cobalt-60 in connection with the method of FIG. 5. Referring to FIG. 8, the $^{60}$Co nuclide undergoes β-decay and emits 2 gamma rays with energies of 1173.2 keV and 1332.5 keV. The location of these main energy peaks can be used for calibration of the present method and system for measuring moisture carryover. In particular, comparing the decay schemes for sodium-24 and cobalt-60, it becomes evident that there is only about 36 keV separating their primary gamma energies (1368.633 keV and 1332.5 keV, respectively). As a result, a relatively high-resolution calibration can be made with the $^{60}$Co source for the 1368.633 keV energy peak of sodium-24. Similarly, it is also worth noting that the summation peak for 60Co is 2505.7 keV, which can also be used as part of the calibration standard lines for the system as it is relatively close to the 2754.028 keV energy peak of $^{24}$Na. Accordingly, a relatively high efficiency calibration can be established for the 1000 keV to 3000 keV energy range using the calibration standard lines.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of measuring moisture carryover (MCO) in a nuclear reactor, comprising:
    detecting a first amount of carryover gamma activity of a first quantity of sodium-24 in steam within a steam conduit of the nuclear reactor with a first gamma detector;
    detecting, with a second gamma detector, a second amount of reference gamma activity of a second quantity of sodium-24 in a reference sample of reactor water from a core of the nuclear reactor; and
    determining, with processing circuitry, a flow rate of liquid water entrained in the steam based on the first amount of carryover gamma activity detected by the first gamma detector and the second amount of reference gamma activity detected by the second gamma detector.

2. The method of claim 1, wherein the detecting with the first gamma detector includes the steam conduit being configured to transport the steam exiting from steam dryers of the nuclear reactor.

3. The method of claim 1, wherein the detecting with the first gamma detector includes the steam conduit being a direct inlet line to turbines of the nuclear reactor.

4. The method of claim 1, wherein the detecting with the first gamma detector includes providing the first gamma detector with a radiation shield including lead and tungsten sections to protect against radiation damage.

5. The method of claim 1, wherein the detecting with the first gamma detector includes the nuclear reactor being a boiling water reactor (BWR).

6. The method of claim 1, wherein the detecting with the first gamma detector includes maintaining the first gamma detector at an operating temperature within a range of 95-105 K.

7. The method of claim 1, wherein the detecting with the first gamma detector and the detecting with the second gamma detector include the first quantity of sodium-24 and the second quantity of sodium-24, respectively, being created within a core of the nuclear reactor.

8. The method of claim 1, wherein the detecting with the first gamma detector and the detecting with the second gamma detector include the first quantity of sodium-24 and the second quantity of sodium-24, respectively, being created from sodium-23 within the reactor water.

9. The method of claim 1, wherein the detecting with the first gamma detector and the detecting with the second gamma detector include counting 1368 keV gamma rays from a decay of the first quantity of sodium-24 and the second quantity of sodium-24, respectively.

10. The method of claim 1, wherein the detecting with the first gamma detector and the detecting with the second gamma detector include a use of a cobalt-60 source for calibration.

11. A moisture carryover measurement system for a nuclear reactor, comprising:
    a first gamma detector adjacent to a steam conduit configured to transport steam generated by a core of the nuclear reactor, the first gamma detector configured to detect a first amount of carryover gamma activity of a first quantity of sodium-24 in the steam within the steam conduit;
    a second gamma detector configured to determine a second amount of reference gamma activity of a second quantity of sodium-24 in a reference sample of reactor water from the core; and
    processing circuitry configured to calculate a flow rate of liquid water entrained in the steam based on a difference between the first amount of carryover gamma activity detected by the first gamma detector and the second amount of reference gamma activity detected by the second gamma detector.

12. The system of claim 11, further comprising:
    steam dryers,
    wherein the steam conduit is configured to transport the steam exiting from steam dryers of the nuclear reactor.

13. The system of claim 11, wherein the steam conduit is a direct inlet line to turbines of the nuclear reactor.

14. The system of claim 11, wherein the first gamma detector includes a radiation shield having lead and tungsten sections to protect against radiation damage.

15. The system of claim 11, wherein the nuclear reactor is a boiling water reactor (BWR).

16. The system of claim 11, further comprising:
    a cooling apparatus configured to maintain the first gamma detector at an operating temperature within a range of 95-105 K.

17. The system of claim 11, wherein the first quantity of sodium-24 and the second quantity of sodium-24 are reactor-generated isotopes created within a core of the nuclear reactor.

18. The system of claim 11, wherein the first quantity of sodium-24 and the second quantity of sodium-24 are reactor-generated isotopes created from sodium-23 within the reactor water.

19. The system of claim 11, wherein the first gamma detector and the second gamma detector are configured to count 1368 keV gamma rays from a decay of the first quantity of sodium-24 and the second quantity of sodium-24, respectively.

20. The system of claim 11, wherein the first gamma detector and the second gamma detector are calibrated with a cobalt-60 source.

* * * * *